US010004655B2

(12) United States Patent
Loduca

(10) Patent No.: US 10,004,655 B2
(45) Date of Patent: Jun. 26, 2018

(54) ROBOTIC SPORTS PERFORMANCE ENHANCEMENT AND REHABILITATION APPARATUS

(71) Applicant: Neurobotics LLC, Whitestone, NY (US)

(72) Inventor: Salvatore Loduca, Great Neck, NY (US)

(73) Assignee: NEUROBOTICS LLC, Whitestone, NY (US)

( * ) Notice: Subject to any disclaimer, the term of this patent is extended or adjusted under 35 U.S.C. 154(b) by 524 days.

(21) Appl. No.: 14/689,759

(22) Filed: Apr. 17, 2015

(65) Prior Publication Data

US 2016/0302989 A1    Oct. 20, 2016

(51) Int. Cl.
*A61H 1/02*    (2006.01)
*A61H 1/00*    (2006.01)
(Continued)

(52) U.S. Cl.
CPC ............... *A61H 1/02* (2013.01); *A61H 1/001* (2013.01); *A61H 1/024* (2013.01); *A61H 1/0214* (2013.01); *A61H 1/0237* (2013.01); *A61H 1/0244* (2013.01); *A61H 1/0274* (2013.01); *A61H 1/0277* (2013.01); *A61H 1/0281* (2013.01); *A61H 1/0255* (2013.01); *A61H 2001/0248* (2013.01); *A61H 2001/0251* (2013.01); *A61H 2201/0119* (2013.01); *A61H 2201/1215* (2013.01); *A61H 2201/1619* (2013.01); *A61H 2201/1638* (2013.01); *A61H 2201/1642* (2013.01); *A61H 2201/1659* (2013.01); *A61H 2201/1676* (2013.01); *A61H 2201/5007* (2013.01); *A61H 2201/5035* (2013.01); *A61H 2201/5043* (2013.01); *A61H 2201/5064* (2013.01); *A61H 2201/5079* (2013.01); *A61H 2203/0456* (2013.01);
(Continued)

(58) Field of Classification Search
CPC .......... A61H 1/00; A61H 1/001; A61H 1/002; A61H 1/0237; A61H 1/024; A61H 1/0244; A61H 1/0266; A61H 1/0274; A61H 1/0277; A61H 1/0281; A61H 2001/0203; A61H 2001/0207; A61H 2001/0248; A61H 2001/0251
USPC ........................ 601/5, 23, 24, 26, 27, 33, 34
See application file for complete search history.

(56) References Cited

U.S. PATENT DOCUMENTS 4,940,218 A    7/1990   Akcelrod
5,201,772 A    4/1993   Maxwell
(Continued)

FOREIGN PATENT DOCUMENTS

WO    2008/103455 A2    8/2008
WO    2011/094841 A1    8/2011
(Continued)

*Primary Examiner* — Colin W Stuart
(74) *Attorney, Agent, or Firm* — Carter, DeLuca, Farrell & Schmidt, LLP

(57) ABSTRACT

A robotic sports apparatus includes a plurality of robotic arms and a plurality of fastening members operably coupled to a respective robotic arm of the plurality of robotic arms. Each fastening member is configured for receiving a limb of a patient. Each robotic arm is configured to move each respective fastening member in at least one of a different direction or a different speed relative to one another for opening neural pathways in the patient.

19 Claims, 3 Drawing Sheets

(51) Int. Cl.
  *A63B 71/00* (2006.01)
  *A63B 21/005* (2006.01)
  *A63B 21/16* (2006.01)
  *A63B 24/00* (2006.01)
  *A63B 26/00* (2006.01)
  *G09B 19/00* (2006.01)
  *A63B 22/00* (2006.01)
  *A63B 21/00* (2006.01)
  *B25J 9/00* (2006.01)
  *B25J 11/00* (2006.01)

(52) U.S. Cl.
  CPC .. *A61H 2203/0481* (2013.01); *A63B 21/0058* (2013.01); *A63B 21/00178* (2013.01); *A63B 21/00181* (2013.01); *A63B 21/16* (2013.01); *A63B 21/1681* (2013.01); *A63B 24/0087* (2013.01); *A63B 26/003* (2013.01); *A63B 71/0009* (2013.01); *A63B 2022/0092* (2013.01); *A63B 2208/0252* (2013.01); *A63B 2208/0285* (2013.01); *A63B 2220/16* (2013.01); *A63B 2220/34* (2013.01); *B25J 9/0084* (2013.01); *B25J 11/00* (2013.01); *G09B 19/0038* (2013.01)

(56) References Cited

U.S. PATENT DOCUMENTS

| | | | |
|---|---|---|---|
| 6,644,976 B2 | 11/2003 | Kullok et al. | |
| 6,692,449 B1 | 2/2004 | Brown | |
| 7,752,050 B1 | 7/2010 | Hameed et al. | |
| 7,940,914 B2 | 5/2011 | Petrushin | |
| 7,951,097 B2 * | 5/2011 | Schaeffer | A61H 1/0222 601/23 |
| 8,249,714 B1 | 8/2012 | Hartman et al. | |
| 8,322,342 B2 | 12/2012 | Soto et al. | |
| 8,706,241 B2 | 4/2014 | Firlik et al. | |
| 2002/0032927 A1 * | 3/2002 | Dinkler | A61B 6/0442 5/601 |
| 2004/0044674 A1 | 3/2004 | Mohammadioun et al. | |
| 2004/0243027 A1 | 12/2004 | Hook | |
| 2008/0132383 A1 * | 6/2008 | Einav | A61H 1/02 482/8 |
| 2008/0200849 A1 * | 8/2008 | Hollington | A61H 15/0078 601/46 |
| 2009/0186746 A1 * | 7/2009 | Pandolfo | A61H 1/003 482/7 |
| 2010/0244504 A1 * | 9/2010 | Colja | A61H 9/0078 297/180.1 |
| 2011/0077562 A1 * | 3/2011 | Wang | A61H 1/0266 601/27 |
| 2011/0300994 A1 * | 12/2011 | Verkaaik | A61H 1/0274 482/51 |
| 2012/0088641 A1 * | 4/2012 | Shah | A61H 1/0274 482/110 |
| 2013/0109904 A1 | 5/2013 | Siljamaki et al. | |
| 2013/0238326 A1 | 9/2013 | Kim et al. | |
| 2015/0305967 A1 * | 10/2015 | O'Neal | A61H 15/00 601/117 |

FOREIGN PATENT DOCUMENTS

| | | |
|---|---|---|
| WO | 2013/066724 A1 | 5/2013 |
| WO | 2014/007837 A1 | 1/2014 |

* cited by examiner

ROBOTIC SPORTS PERFORMANCE ENHANCEMENT AND REHABILITATION APPARATUS

BACKGROUND

Top athletes are noted to be highly coordinated and have excellent hand-eye coordination. Good coordination is a function of balance and balance is a function of the level of open neural pathways in the brain that control the right and left sides of the body working in tandem. The higher the degree of ambidexterity (naturally occurring open pathways) an individual athlete may have, the higher the level of coordination, balance, and hand-eye coordination.

All athletes that utilize a predominant or dominant side of the body such as baseball hitters, baseball pitchers, tennis players, football quarterbacks, football kickers, and golfers will conduct sport specific training solely on their predominant or dominant side. This unilateral type of training creates recurring usage of a specific group of proprioceptive-neural-motor muscular pathways. The brain seeks out pathways of least resistance or those pathways most often used. In many sports, when an athlete needs to be flexible in game situation to make their bodies or limbs move in the direction of an eye focused target, motor muscular movement may take upon its own involuntary movement utilizing those pathways it has taken thousands of times before in practice. As a consequence, muscle movement in athletes may take upon a neural pathway that makes the movement more "preprogrammed" and involuntary rather than a more controlled, voluntary movement, especially in instances where reaction times need to occur in short intervals of seconds or milliseconds.

When one considers that there are approximately 84 billion neurons in the brain, the possible combination and connections among and between those neurons to control motor muscular movement from differing external stimuli and proprioceptive interactions is quite staggering. In sport specific training and in any sport that predominantly uses one side or dominant side of the body, the number of proprioceptive-neural-motor-muscular pathways that an athlete will use has a certain threshold based on repetitive moment. That threshold among athletes will vary depending on how naturally ambidextrous that individual may be.

Much scientific study and research can be found for contralateral effects and cross education principles utilized in rehab for sports athletes and medical rehab for stroke victims for over a century. As an example, Ichiro Suzuki is a left handed hitter who throws a baseball with his right hand. During batting practice Ichiro hits from both sides like a switch hitter, however, he always bats left at the plate in live game situations. When asked why he only bats left during games, when he could easily be a switch hitter, he responds that switch hitting practice creates "balance." Except for switch hitters in baseball, most, if not all batters consider a bilateral approach a waste of time. Another example is Yu Darvish who is a right handed pitcher. In practice during warm ups before a game, Yu Darvish will be seen throwing the baseball with his left arm. It is noted that Darvish can pitch 85 mph with his left arm. When asked why he practices with his left, his response is the same as Ichiro Suzuki, it creates "balance."

The bilateral approach to sport specific training, where an athlete trains the opposite or non-dominant side of his body fosters activation of proprioceptive-neural-motor muscular pathways that have previously been dormant. If the brain could compared to a GPS coordinate system with both sides of the brain open and mapped, in the same manner that a precise route can be found through the GPS, the eye's focus will move the muscles to a route to reach its intended target. When part of the brain is not open or "mapped" because it has not been activated, the proprioceptive focus moving the muscles to its intended target is simply not as precise, creating larger margins of error.

Accordingly, given potential resistance of athletes to train their non-dominant side or fully understand the beneficial cross-over effects that contra-lateral and cross education principles provide, a need exists for an apparatus that opens unused neural pathways in the brain through a safe, natural, and organic process without requiring that the athlete exercise his or her non-dominant side in a sport specific way.

SUMMARY

In one embodiment of the present disclosure, provided is an apparatus that can effectuate the activation and opening of proprioceptive-neural-motor muscular pathways through a safe, natural, and organic process. The apparatus will effectively replace the need to work the non-dominant side of the body while providing the athlete the benefits that contra-lateral and cross education training creates.

The present disclosure provides a robotic sports enhancement and rehabilitation apparatus that is designed to activate proprioceptive-neural-motor muscular pathways through movement of the limbs from a randomization approach. The apparatus may provide movement in a plurality of limbs, for example, the four main limbs, where each limb moves independently in direction and speed in a manner that is physically impossible for any human to accomplish on their own. Dormant neural pathways in the brain which would have previously been impossible to activate by natural means, can now be activated through robotics and the apparatus of the present disclosure.

In one aspect of the present disclosure, provided is a robotic sports apparatus that provides amateur and professional athletes a way to open and activate existing unused proprioceptive-neuro-motor muscular neural pathways in the brain through a motor muscular conduit and a pure randomization methodology. The robotic sports apparatus of the present disclosure provides a natural and safe method to, inter alia, heighten levels of bilateral hand-eye coordination and provide greater level of precision in lower limb movement with accompanying heightened awareness in reflex and balance.

In one embodiment of the present disclosure, provided is a robotic sports apparatus that includes a plurality of robotic arms and a plurality of fastening members operably coupled to a respective robotic arm of the plurality of robotic arms. Each fastening member is configured for receiving a limb of a patient. Each robotic arm is configured to move each respective fastening member in at least one of a different direction or a different speed relative to one another.

In some embodiments, each robotic arm may be composed of a plurality of segments movably coupled to one another. It is contemplated that each fastening member may include at least one joint. A first pair of fastening members may be configured for receipt of a pair of arms of a patient. A second pair of fastening members may be configured for receipt of a pair of legs of a patient.

It is envisioned that the plurality of robotic arms may be configured to move each respective fastening member in a different direction and a different speed relative to one another.

In some embodiments, the robotic sports apparatus may further include a table configured for supporting a patient thereon. The table may have a proximal end and a distal end. The proximal end may define a pair of arcuate cutouts therein and the distal end may define a pair of arcuate cutouts therein.

It is contemplated that the robotic sports apparatus may further include a platform having the plurality of robotic arms and the table supported thereon.

It is envisioned that the plurality of fastening members may be sleeves.

In some embodiments, the robotic sports apparatus may further include a control device operably connected to the plurality of robotic arms for directing a selected movement of the plurality of robotic arms.

In another aspect of the present disclosure, a method of opening neural pathways in an athlete is provided. The method includes inserting at least two limbs of an athlete into a respective fastening member of a plurality of fastening members of a robotic sports apparatus. Each fastening member is operably coupled to a respective robotic arm of the robotic sports apparatus. The method further includes actuating the plurality of robotic arms to effect movement of the at least two limbs of the athlete. The limbs are moved in at least one of a different direction or a different speed relative to one another.

In some embodiments, the at least two limbs may be moved in a different direction and a different speed relative to one another.

It is contemplated that the method may further include positioning the athlete on a table of the robotic sports apparatus.

Further details, advantages, and aspects of exemplary embodiments of the present disclosure are described in more detail below with reference to the appended figures.

As used herein, the terms parallel and perpendicular are understood to include relative configurations that are substantially parallel and substantially perpendicular up to about + or −10 degrees from true parallel and true perpendicular.

As used herein, the term "limb" is defined to include an arm, a leg, a foot, a hand, a finger, a toe, a neck, or a portion of any one of the above.

BRIEF DESCRIPTION OF THE DRAWINGS

Embodiments of the present disclosure are described herein with reference to the accompanying drawings, wherein.

DETAILED DESCRIPTION

Figure 1:
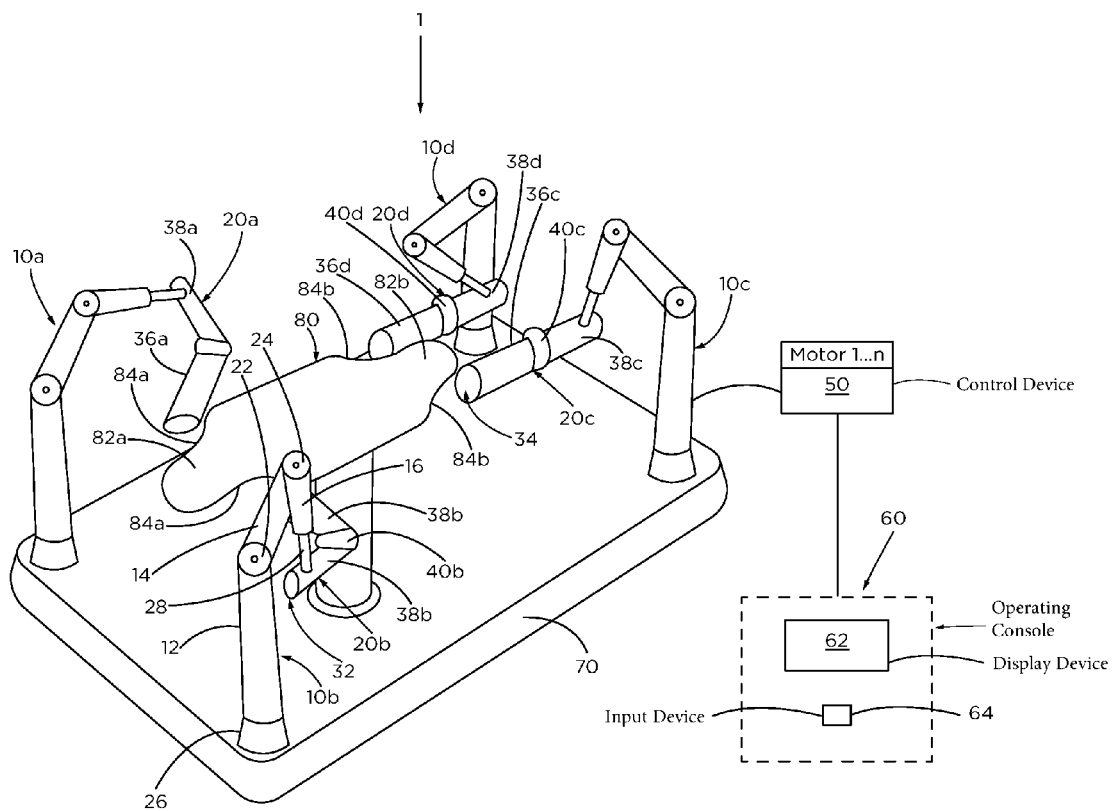
FIG. 1 is a perspective view of a robotic sports apparatus in accordance with the principles of the present disclosure.

Embodiments of the presently disclosed robotic sports apparatus are described in detail with reference to the drawings, in which like reference numerals designate identical or corresponding elements in each of the several views.

The present disclosure provides a mechanism that can effectuate the activation of and opening of proprioceptive-neural-motor muscular pathways through a safe, natural, and organic process. The instant robotic sports enhancement and rehabilitation apparatus will effectively replace the need to work the non-dominant side of the body while providing the athlete the benefits that contra-lateral and cross education training creates.

Figure 2:
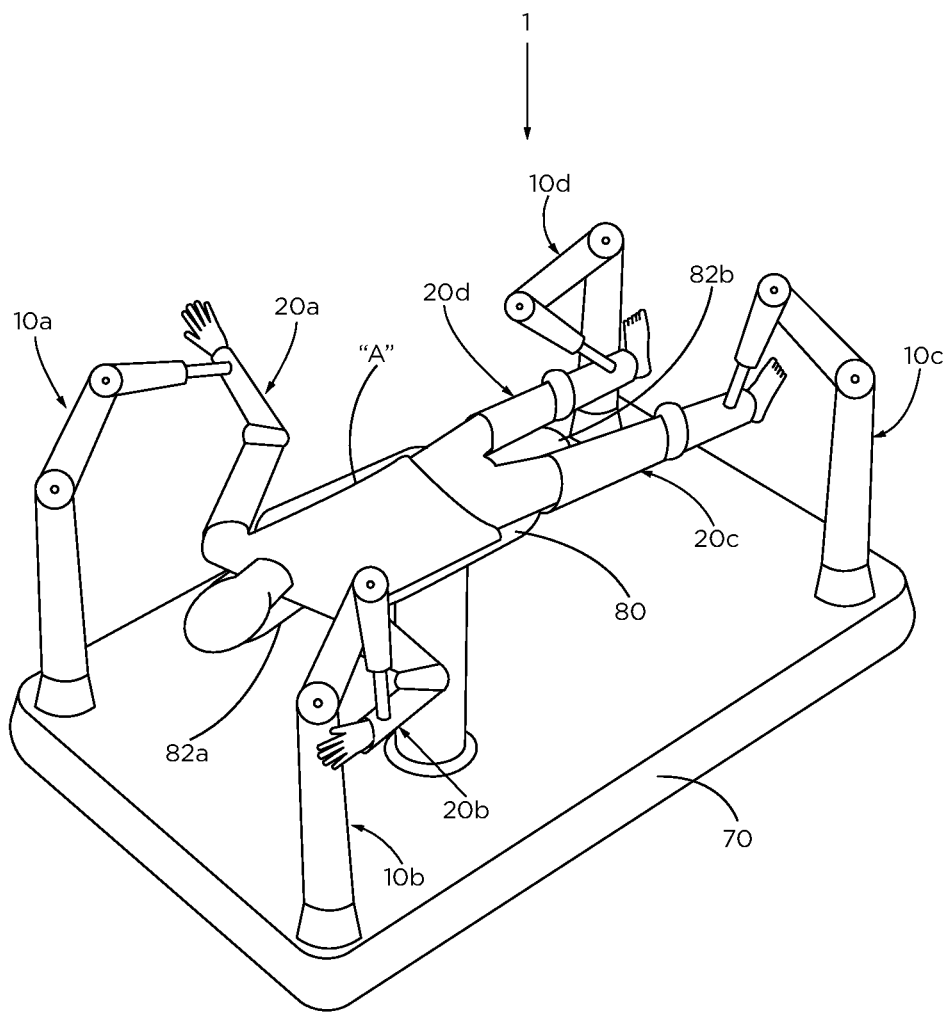
FIG. 2 is a perspective view of the robotic sports apparatus of FIG. 1 with a patient disposed thereon.

Referring initially to FIGS. 1 and 2, illustrated is a robotic sports apparatus, generally designated by reference numeral 1, for rehabilitating an injured patient, such as, for example, an athlete, or enhancing the motor functions of the athlete, by opening and activating existing, unused proprioceptive-neuro-motor muscular neural pathways in the brain, as will be described in detail herein.

It is contemplated that the robotic sports apparatus 1 may have applications other than in the sports field. For example, in some embodiments, the apparatus 1 may be used in the medical field to treat various cognitive or neurological dysfunctions and various diseases of the mind, such as, for example, dementia, Alzheimer's disease, Parkinson's disease, brain trauma, brain damage associated with stroke victims, memory loss, attention deficit disorder, obsessive compulsive disorder, autism, or the like.

Robotic sports apparatus 1 generally includes a plurality of robotic arms 10a, 10b, 10c, 10d and a plurality of fastening members, such as, for example, sleeves 20a, 20b, 20c, 20d operably coupled to robotic arms 10a-d, respectively. As will be described in detail herein, robotic arms 10a-d are configured to move sleeves 20a-d, which have a patient's limbs associated therewith, in a discrete direction from one another and at a discrete speed from one another. Each of the robotic arms 10a-d may be composed of a plurality of segments 12, 14, 16, which are connected through joints 22, 24 such that robotic arms 10a-d have a plurality of degrees of freedom to move in a variety of directions. Movement of each segment 12, 14, 16 of robotic arms 10a-d relative to one another may be driven by electric drives (not shown) that are connected to a control device 50, as will be described in greater detail below. Robotic arms 10a-d have a proximal end 26 supported on a base or platform 70, and a distal end 28. Proximal end 26 may be rotatable relative to platform 70. Distal end 28 of each robotic arm 10a-d may be configured to be selectively extendable and retractable along a longitudinal axis defined by distal end 28.

Distal end 28 of each robotic arm 10a-d has a respective sleeve 20a-d operably coupled thereto. Each sleeve 20a-d is moved independently from one another at a different speed or rate and in a different direction. Sleeves 20a-d are configured for receiving a limb of a patient. For example, a first pair of sleeves 20a, 20b that are associated with robotic arms 10a, 20b define a passageway 32 therethrough configured for receipt and retention of at least a portion of a pair of arms of a patient. A second pair of sleeves 20c, 20d that are associated with respective robotic arms 10c, 10d define a passageway 34 therethrough configured for receipt and retention of at least a portion of a pair of legs of the patient. As such, upon strapping a patient to robotic sports apparatus 1, both the arms and legs of the patient are retained within a corresponding sleeve 20a-d to be moved by robotic arms 10a-d in a variety of directions and at a variety of speeds. In some embodiments, one or more sleeves 20a-d may be configured for receipt and retention of various body parts of a patient, for example, hands, fingers, toes, feet, head, torso, etc.

Each sleeve 20a-d is composed of first and second segments 36a-d, 38a-d movably coupled to one another via a joint 40a-d. First segments 36a, 36b of the first pair of sleeves 20a, 20b is configured for receipt of an upper portion of a patient's arms, and second segments 38a, 38b of the first pair of sleeves 20a, 20b are configured for receipt of a lower portion of the patient's arms. Further, first segments 36c, 36d of the second pair of sleeves 20c, 20d are configured for receipt of an upper portion of a patient's legs, and second segments 38c, 38d of the second pair of sleeves 20c, 20d are configured for receipt of a lower portion of the patient's legs. In some embodiments, each robotic arm 10a-d may include one or more branches (i.e., distal ends 28) that each attach to a different segment of the associated sleeve for selectively moving the associated segment.

It is contemplated that sleeves 20a-d may be composed of only one segment without a joint. It is further contemplated that sleeves 20a-d may include more than two segments and more than one joint and may be flexible or rigid. In some embodiments, sleeves 20a-d may include a variety of fastening members to fasten and/or tighten sleeves 20a-d to the respective limb, for example, straps, buckles, hook and loop fasteners, adhesives, or the like.

Robotic sports apparatus 1 may include a control device 50 and an operating console 60 coupled with control device 50. Control device 50 may control a plurality of motors, e.g., motors (Motor 1 ... n), with each motor configured to drive the independent movement of robotic arms 20a-d to effect movement of sleeves 20a-d in a plurality of directions and at a plurality of speeds. Operating console 60 includes a display device 62, which is set up in particular to display two or three-dimensional images; and a manual input device 64 by means of which a person (not shown) is able to input information into control device 50 for programming the direction and speed of movement of robotic arms 10a-d. Control device 50 (e.g., a computer) is set up to activate the drives (not shown) or robotic arms 10a-d, in particular by means of a computer program, in such a way that robotic arms 10a-d, and the attached sleeves 20a-d execute a desired movement according to a movement defined by means of manual input device 64.

Alternately, control device 50 may be pre-programmed to move robotic arms 10a-d at a pre-selected speed and in a pre-selected direction by having the pre-programmed movements stored in a memory (not shown) of control device 50. The memory may have a plurality of stored, unique pre-programmed movements of robotic arms 10a-d that are each tailored for a particular person. For example, one of the stored pre-programmed movements of robotic arms 10a-d may be tailored to treat a particular cognitive dysfunction, to rehabilitate a particular type of injury, or to improve or maintain the motor skills of a particular type of athlete.

Robotic sports apparatus 1 further includes a platform or base 70 and a table 80. Platform 70 supports the proximal end 26 of each robotic arm 10a-d and table 80 thereon. In some embodiments, robotic arms 10a-d may be suspended from a ceiling or a gantry that extends over table 80. Table 80 is configured for supporting a patient thereon. Table 80 has a generally elongated configuration having a proximal end 82a and a distal end 82b. Proximal end 82a is configured for supporting an upper portion of a patient's body and distal end 82b is configured for supporting a lower portion of a patient's body. Proximal end 82a of table 80 has a pair of arcuate cutouts 84a therein that are designed to allow for a greater freedom of movement of arms of a patient lying on table 80. Distal end 82b of table 80 has a pair of arcuate cutouts 84b therein that are designed to allow for a greater freedom of movement of legs of a patient lying on table 80. In some embodiments, cutouts 84a, 84b may assume a variety of shapes, such as, for example, squared, triangular, or the like.

In use, a patient, for example, an athlete "A" is positioned on table 80 with his or her arms inserted within sleeves 20a, 20b of robotic sports apparatus 1 and his or her legs inserted within sleeves 20c, 20d of robotic sports apparatus 1. Depending on the type of athlete (e.g., baseball player, boxer, football player, etc.) being treated by robotic sports apparatus 1, a particular operation of robotic sports apparatus 1 or a particular stored, pre-programmed movement of robotic arms 10a-d will be selected. Upon selecting the particular operation that is tailored for athlete "A," the motors of robotic arms 10a-d will be activated to effect movement of robotic arms 10a-d and associated sleeves 20a-d.

Robotic sports apparatus 1 moves sleeves 20a-d independently from one another at a discreet speed and in a discrete direction relative to one another. For example, sleeve 20a may move one arm of athlete "A" at a first speed (e.g., 0.1 m/s) and in a circular motion in a coronal plane of athlete "A;" sleeve 20b may move the other arm of athlete "A" at a second speed (e.g., 0.2 m/s) and in a circular motion in a transverse plane of athlete "A;" sleeve 20c may move one leg of athlete "A" at a third speed (e.g., 0.3 m/s) in an up and down motion parallel to a sagittal plane of athlete "A;" and sleeve 20d may move the other leg of athlete "A" at a fourth speed (e.g., 0.4 m/s) in a counter-clockwise direction. As such, no limb will be moving at the same speed or in the same direction as any other limb. It is contemplated that limbs and other body parts of athlete "A" may be moved in a plurality of directions other than those mentioned above. It is further contemplated that the speed and direction of sleeves 20a-d may change randomly during the same treatment.

As can be appreciated, the randomized movement of sleeves 20a-d and ultimately of limbs of athlete "A" cannot be accomplished by a person without the assistance of robotic sports apparatus 1. This randomized limb movement made possible by robotic sports apparatus 1 opens unused neural pathways in the brain to, inter alia, heighten levels of bilateral hand-eye coordination and provide greater level of precision in lower limb movement with accompanying heightened awareness in reflex and balance.

Figure 3:
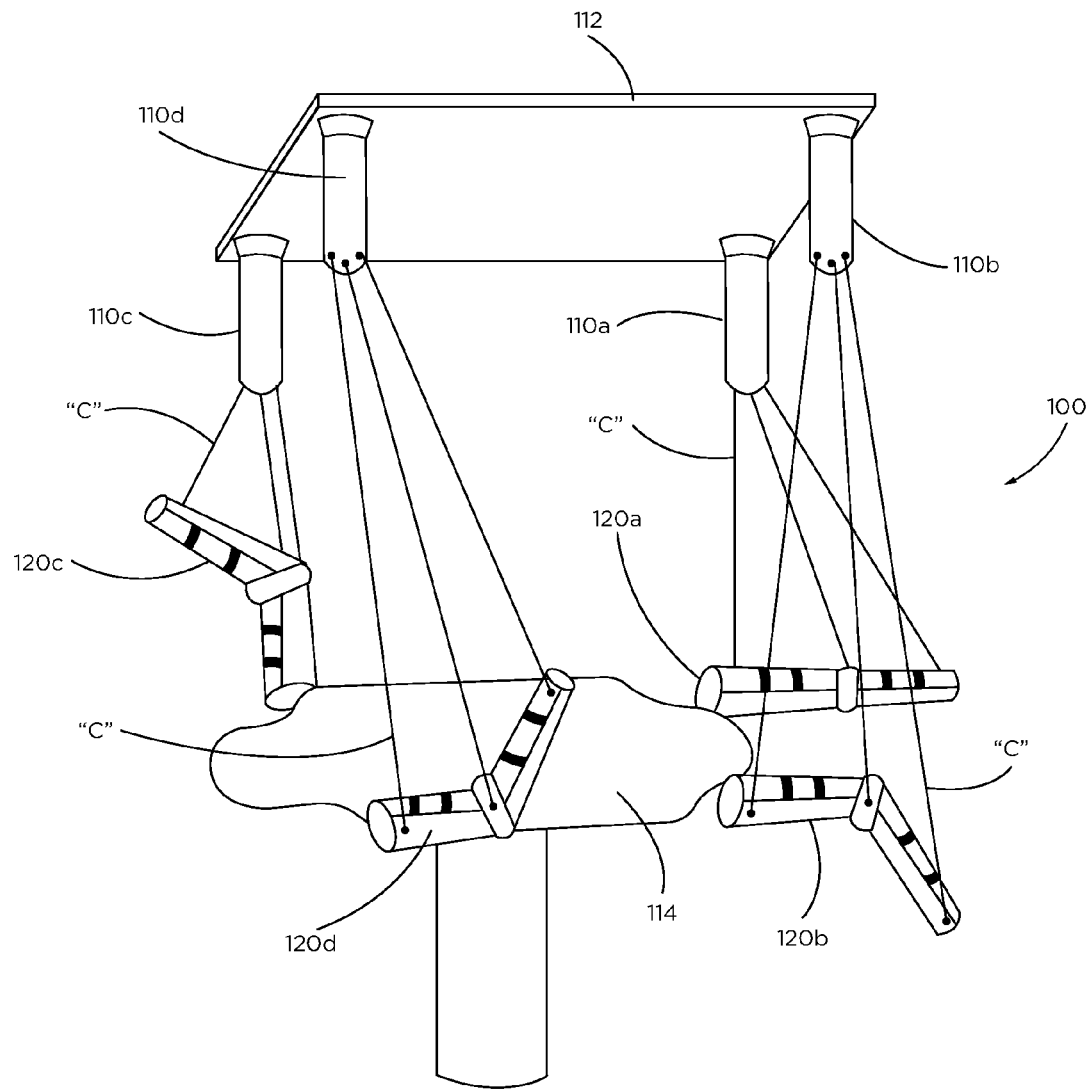
FIG. 3 is a perspective view of another embodiment of a robotic sports apparatus in accordance with the principles of the present disclosure.

With reference to FIG. 3, an alternate embodiment of a robotic sports apparatus is illustrated and is designated generally by reference numeral 100. Robotic sports apparatus 100 is similar to apparatus 1 described above, and therefore will only be described with respect to its difference(s). Robotic sports apparatus 100 differs from robotic sports apparatus 1 in the manner in which its robotic arms 110a-d are designed to effect movement of associated sleeves 120a-d.

In particular, robotic arms 110a-d are suspended from a ceiling or gantry 112 that extends over a table 114. Robotic arms 110a-d include a plurality of cables "C" connected to different portions of sleeves 120a-d for moving sleeves 120a-d in a variety of directions. Cables "C" are each connected to a motor (not shown) that retracts or extends cables "C" to effect movement of sleeves 120a-d in a different direction and at a different speed from one another. In some embodiments, robotic arms 110a-d may each be configured to rotate about a longitudinal axis defined by each robotic arm 110a-d relative to gantry or ceiling 112. Robotic arms 110a-d may be further configured to rotate relative to gantry or ceiling 112 in a plurality of directions to provide for greater degrees of movement of sleeves 120a-d.

It will be understood that various modifications may be made to the embodiments disclosed herein. Therefore, the above description should not be construed as limiting, but merely as exemplifications of various embodiments. Those skilled in the art will envision other modifications within the scope and spirit of the claims appended thereto.

What is claimed is:

1. A robotic sports apparatus, comprising:
   a plurality of robotic arms;
   a plurality of fastening members operably coupled to a respective robotic arm of the plurality of robotic arms, each fastening member of the plurality of fastening members being configured for receiving a limb of a patient, wherein each robotic arm of the plurality of robotic arms is configured to move each respective fastening member of the plurality of fastening members in at least one of a different direction or a different speed relative to one another; and
   a control device operably connected to the plurality of robotic arms for directing a selected movement of the plurality of robotic arms, the control device being configured to randomly change the direction and speed of the plurality of fastening members.

2. The robotic sports apparatus according to claim 1, wherein each robotic arm of the plurality of robotic arms is composed of a plurality of segments movably coupled to one another.

3. The robotic sports apparatus according to claim 1, wherein each fastening member of the plurality of fastening members includes at least one joint.

4. The robotic sports apparatus according to claim 1, wherein a first pair of fastening members of the plurality of fastening members is configured for receipt of a pair of arms of the patient, and a second pair of fastening members of the plurality of fastening members is configured for receipt of a pair of legs of the patient.

5. The robotic sports apparatus according to claim 1, wherein the plurality of robotic arms is configured to move each respective fastening member of the plurality of fastening members in a different direction and a different speed relative to one another.

6. The robotic sports apparatus according to claim 1, further comprising a table configured for supporting the patient thereon.

7. The robotic sports apparatus according to claim 6, wherein the table has a proximal end and a distal end, the proximal end defining a pair of arcuate cutouts therein and the distal end defining a pair of arcuate cutouts therein.

8. The robotic sports apparatus according to claim 6, further comprising a platform having the plurality of robotic arms and the table supported thereon.

9. The robotic sports apparatus according to claim 1, wherein the plurality of fastening members are sleeves.

10. A method of opening neural pathways in an athlete, comprising;
    inserting at least two limbs of an athlete into a respective fastening member of a plurality of fastening members of a robotic sports apparatus, wherein each fastening member of the plurality of fastening members is operably coupled to a respective robotic arm of a plurality of robotic arms of the robotic sports apparatus;
    actuating the plurality of robotic arms to effect movement of the at least two limbs of the athlete, wherein the at least two limbs are moved in a different direction and a different speed relative to one another; and
    randomly changing the direction and speed of the at least two limbs.

11. The method according to claim 10, further comprising positioning the athlete on a table of the robotic sports apparatus.

12. The method according to claim 11, wherein the table has a proximal end and a distal end, the proximal end defining a pair of arcuate cutouts therein and the distal end defining a pair of arcuate cutouts therein.

13. The method according to claim 10, wherein each robotic arm of the plurality of robotic arms is composed of a plurality of segments movably coupled to one another.

14. The method according to claim 10, wherein each fastening member of the plurality of fastening members includes at least one joint.

15. The method according to claim 10, wherein a first pair of fastening members of the plurality of fastening members is configured for receipt of a pair of arms of the athlete, and a second pair of fastening members of the plurality of fastening members is configured for receipt of a pair of legs of the athlete.

16. The method according to claim 10, wherein the robotic sports apparatus further includes a platform having the plurality of robotic arms supported thereon.

17. The method according to claim 10, wherein the plurality of fastening members are sleeves.

18. The method according to claim 10, wherein the robotic sports apparatus further includes a control device operably connected to the plurality of robotic arms for directing a selected movement of the plurality of robotic arms.

19. The method according to claim 10, wherein the at least two limbs includes a pair of arms and a pair of legs of the athlete, each of the pair of arms and each of the pair of legs being moved randomly at a different speed and a different direction from one another.

* * * * *